(No Model.)

F. W. SNOW.
SWITCH STAND.

No. 466,379. Patented Jan. 5, 1892.

WITNESSES
Jno. G. Hinkel
H. S. McArthur

INVENTOR
Fred. W. Snow.
By Foster & Freeman
Attorneys

UNITED STATES PATENT OFFICE.

FRED. W. SNOW, OF HILLBURN, NEW YORK.

SWITCH-STAND.

SPECIFICATION forming part of Letters Patent No. 466,379, dated January 5, 1892.

Application filed June 2, 1891. Serial No. 394,844. (No model.)

*To all whom it may concern:*

Be it known that I, FRED. W. SNOW, a citizen of the United States, residing at Hillburn, in the county of Rockland and State of New York, have invented certain new and useful Improvements in Switch-Stands, of which the following is a specification.

My invention relates to that class of switch-operating appliances in which the switch-lever is locked by the power of the spring operating through a clutch having inclined engaging-teeth that are caused to ride upon each other to force back the spring when the power of the moving car is applied to swing the switch-rail; and my invention consists in constructing the parts, as fully set forth hereinafter, and as illustrated in the accompanying drawings, in which—

Figure 1:
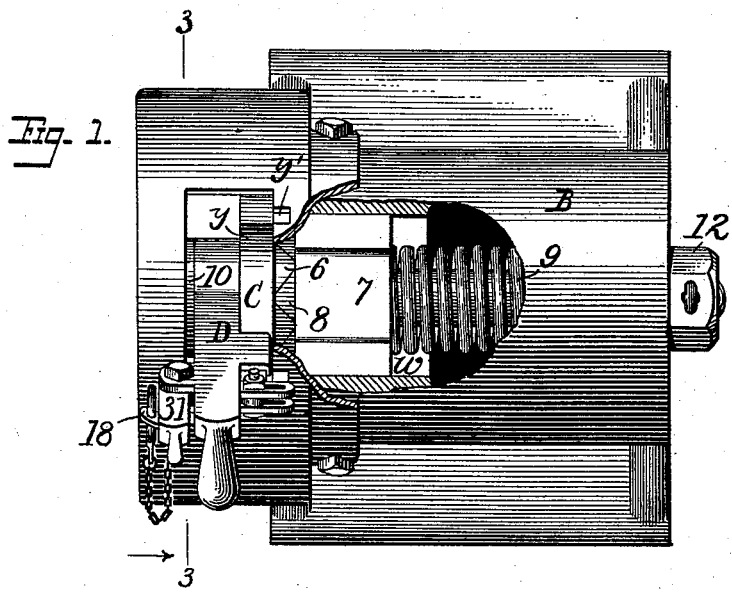
Figure 2:
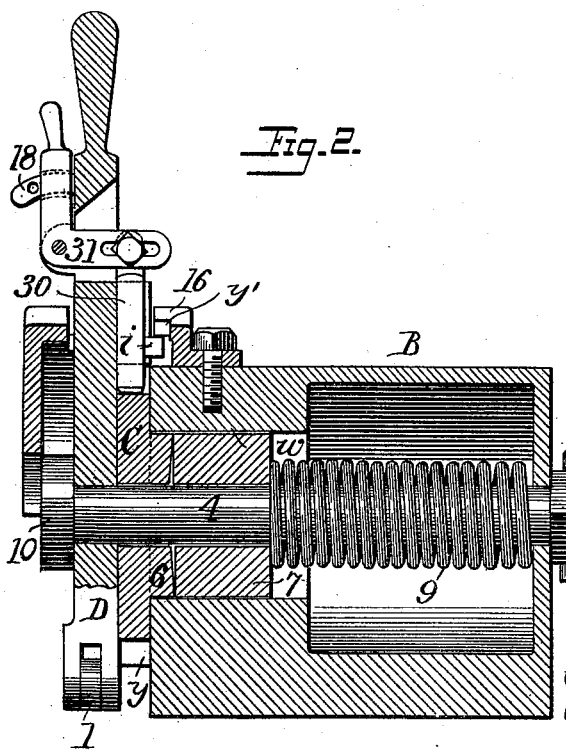
Figure 3:
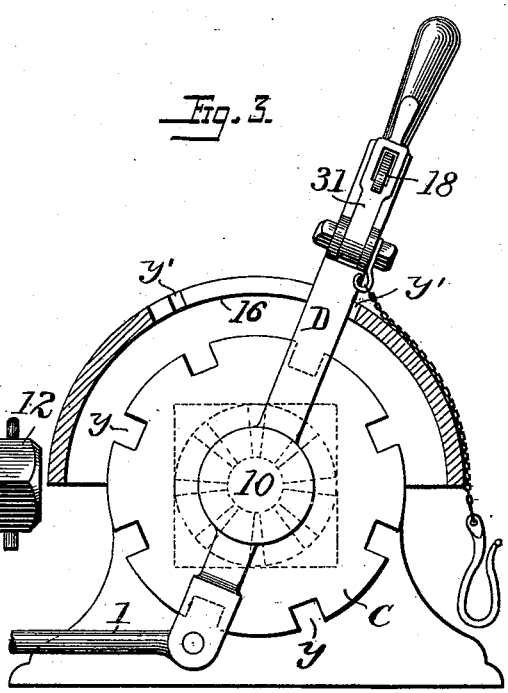

Figure 1 is a plan view with part of the frame broken away, illustrating a switch-operating stand embodying my improvements. Fig. 2 is a longitudinal section. Fig. 3 is a transverse section on the line 3 3, Fig. 1, looking in the direction of the arrow.

The frame B of the stand is shown in the form of a closed casing arranged horizontally and supporting the horizontal shaft 4, and having an angular recess $w$ at one end to receive the angular block that constitutes the part 7 of a clutch, which part bears against a spring 9, and can slide back and forth without turning, and has angular teeth 8, arranged in a circle and fitting the notches between another series of angular teeth 6, arranged in a circle upon the part C of the clutch, which part is in the form of a disk turning upon a shaft 4.

The switch-lever D swings freely on the shaft 4, and the switch-rod 1 is pivoted to the lower end of the lever D, which carries a bolt 30, that may be moved to enter notches $y$ in the periphery of the disk C, in order to lock the switch-lever to one part of the clutch. When thus locked together, the lever D cannot be swung by the power of the car-wheel acting upon the switch-rail, nor by the switchman without applying sufficient power to force back the part 7 against the power of the spring 9, and when this is done the spring will be compressed until the points of the teeth pass each other, when the block 7 will be forced outward and the sides of its teeth 8, acting upon the inclined sides of the teeth 6, will complete the movements of the part 6 and the lever D already begun. When the switch is to be shifted by the switchman without resistance, the bolt 30 is moved out of the notch $y$, when the switch-lever can be swung without turning the clutch or compressing the spring 9. The bolt 30 is shifted by means of a bell-crank lever 31, pivoted to the lever D and connected with the bolt, and the lever D is provided with a perforated projection 18, through which the hasp of a lock may be passed to lock the lever 31 in place.

In order to insure the complete throw of the switch-rail, I provide means for preventing the lever from being unlocked from the clutch until said lever is in one of its extreme positions. Thus a lug or projection $i$ upon the bolt 30 is arranged in such relation to a curved flange 16 upon the frame that the said lug will strike the bottom or the top of the flange if any attempt is made to move the bolt 30, except when the lever D is in its extreme position when the lug $i$ will be opposite the lug $y'$ $y'$, that will permit the bolt to be moved. The shaft 4 is provided with a head 10 at one end and with a lock-nut 12 at the other, and it will be seen that by unlocking and withdrawing this shaft all of the parts of the device may be readily detached from the frame, and by extending the projecting teeth into the recess $w$ the weight and strain are taken from the shaft 4, so that the frame B bears the weight of all the parts except that of the spring 9, which is supported wholly by the shaft.

To facilitate and cheapen the manufacture, the part of the frame that is provided with the notched flange 16 is made in the form of a nook or saddle curved to fit the face of the frame, bolted detachably thereto, and provided with an opening through which the lever D can swing, and acting as a guard to protect the parts below it.

It will be seen that by connecting the parts, as described, the switch-rail may be shifted by the switchman without moving any other parts of the apparatus than the switch-lever, and that the clutch may be thrown into action by simply locking the said lever directly to one section of the clutch. Inasmuch as the section that moves with the lever may act with the latter upon one movement and may then remain quiescent when the lever is shifted, it is necessary that the parts should be in position to resist the next opposite movement of the lever, and I therefore provide the clutch-section with the disk and a series of notches, so that the lever may be locked thereto whenever it is in either extreme position and whatever may have been the extent or direction to which the clutch-section has been turned.

By making the frame in the form of a closed horizontal face I secure great strength, cheapness of construction, effectually protect the working parts from injury, and prevent them from being clogged by snow or ice.

Without limiting myself to the precise construction and arrangement of parts shown and described, I claim—

1. The combination, in a switch-stand, with a shaft, of a sliding clutch-section bearing against a spring, a rotating clutch-section engaging with the sliding section, and a switch-lever turning on the shaft, and a movable bolt for locking the lever to the rotating section of the clutch, substantially as set forth.

2. The combination, with the shaft, sliding clutch-section bearing against the spring and with a switch-lever turning on the shaft, of an intermediate rotating clutch-section having a series of peripheral notches or teeth, and a bolt carried by the lever for engaging said notches or teeth, substantially as set forth.

3. The combination, with the sliding and rotating clutch-sections, spring, lever, and bolt carried thereby for locking the rotating section to the lever, of a projection or lug extending from said bolt, and a flange 16, having notches for the passage of said projection, substantially as set forth.

4. The combination, with the shaft, the switch-lever turning on the shaft, clutch-sections, and bolt, of a bolt-operating lever 31, and means for locking the latter, substantially as and for the purpose described.

5. The combination, in a switch-stand, of a lever, a rotating clutch-section, a sliding clutch-section, a spring bearing on the latter, and a frame in the form of a horizontal closed casing supporting all the parts and provided with guides for the sliding clutch-section, substantially as set forth.

6. The combination, with the shaft, the lever turning on the shaft, clutch-section, and spring, of a frame having a recess for receiving the sliding section and a projecting portion of the turning section, substantially as described.

7. The combination, with the frame in the form of a horizontal case, of a switch-lever and clutch-sections and spring, and a bolt passing through the lever clutch-sections and spring and case and secured detachably, substantially as set forth.

8. The combination, with the case B, of a yoke provided with a slot for the passage of the switch-lever and secured detachably to the case, substantially as set forth.

In testimony whereof I have signed my name to this specification in the presence of two subscribing witnesses.

FRED. W. SNOW.

Witnesses:
WM. A. CHAPMAN,
R. J. DAVIDSON.